(12) United States Patent
Peters et al.

(10) Patent No.: US 8,705,173 B2
(45) Date of Patent: Apr. 22, 2014

(54) OPTICAL RANGEFINDER AND RETICLE SYSTEM FOR VARIABLE OPTICAL POWER SIGHTING DEVICES

(75) Inventors: Victoria J. Peters, Vernonia, OR (US); Timothy Lesser, Forest Grove, OR (US); Andrew W. York, Portland, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 238 days.

(21) Appl. No.: 13/343,680

(22) Filed: Jan. 4, 2012

(65) Prior Publication Data

US 2013/0170027 A1    Jul. 4, 2013

(51) Int. Cl.
    *G02B 23/00*    (2006.01)
(52) U.S. Cl.
    USPC .......................................... 359/428; 359/432
(58) Field of Classification Search
    USPC .................................. 359/428, 432
    See application file for complete search history.

(56) References Cited

U.S. PATENT DOCUMENTS

| | | | |
|---|---|---|---|
| 3,123,915 A | | 3/1964 | Wilkinson |
| 3,386,330 A | | 6/1968 | Carson |
| 3,471,213 A | | 10/1969 | Back |
| 3,492,733 A | * | 2/1970 | Leatherwood .................. 42/122 |
| 3,684,376 A | | 8/1972 | Lessard |
| 3,782,822 A | * | 1/1974 | Spence ............................ 356/21 |
| 3,948,587 A | * | 4/1976 | Rubbert ........................... 356/21 |
| 4,248,496 A | | 2/1981 | Akin, Jr. et al. |
| 4,380,876 A | | 4/1983 | Strassburg |
| 4,389,791 A | | 6/1983 | Ackerman |
| 4,403,421 A | | 9/1983 | Shepherd |
| 4,497,548 A | | 2/1985 | Burris |
| 6,729,062 B2 | | 5/2004 | Thomas |
| 6,738,148 B2 | | 5/2004 | Dunne et al. |
| 7,738,082 B1 | | 6/2010 | Peters |
| 7,944,611 B1 | | 5/2011 | Regan et al. |
| 2009/0199451 A1 | * | 8/2009 | Zaderey et al. .................. 42/122 |
| 2011/0176207 A1 | | 7/2011 | Tesmar et al. |

FOREIGN PATENT DOCUMENTS

RU    2313754 C2    12/2007

OTHER PUBLICATIONS

U.S. Marine Corps, FMFM 1-3B, Sniping, (excerpt showing "The Redfield Telescope"), Aug. 1969, 1 page.

* cited by examiner

*Primary Examiner* — Frank Font
(74) *Attorney, Agent, or Firm* — Stoel Rives LLP

(57) ABSTRACT

A reticle system for a variable optical power sighting device includes front and rear reticles proximate respective front and rear focal planes of the device. Range-compensating features are provided, such as a scale and a pair of bracketing marks formed in the rear reticle which cooperate with an indicator mark formed in the front reticle. The indicator mark is radially offset from the optical axis it appears to move in the field of view along the scale in response to adjustment of the optical power to thereby indicate a measurement corresponding to a size of a distant target subtended in the field of view by the bracketing marks. A two-part electronic reticle system is also disclosed utilizing similar principles of operation. The rear reticle and scale may be electroformed to reduce cost and improve light transmission relative to a glass reticle.

20 Claims, 6 Drawing Sheets

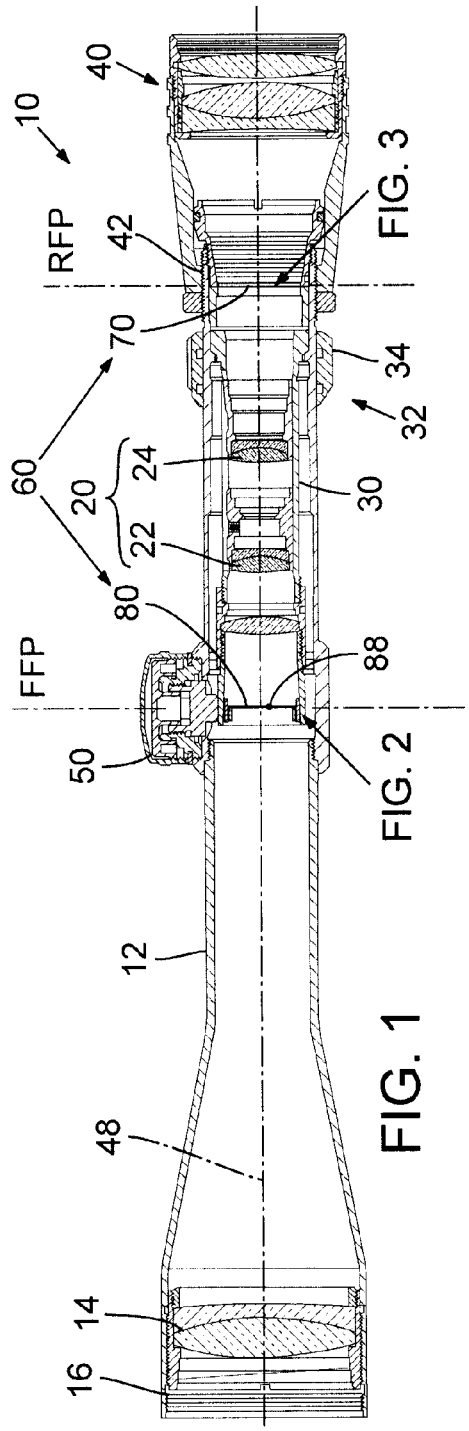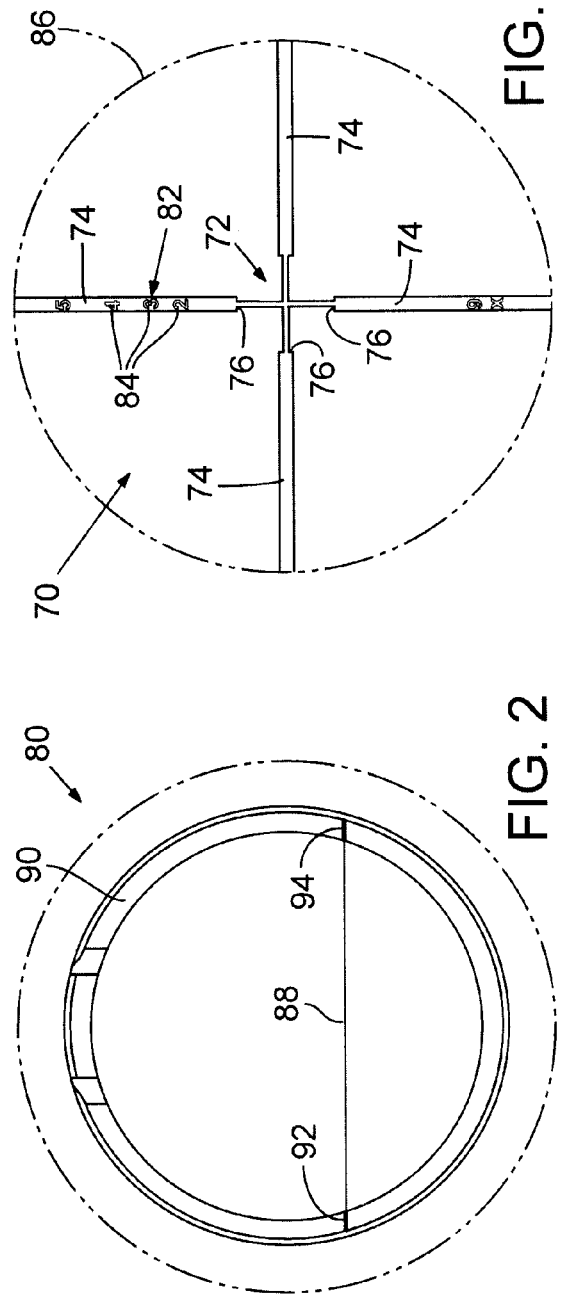

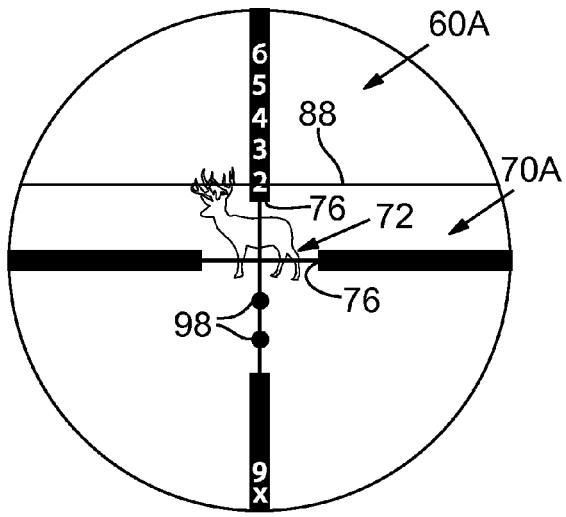
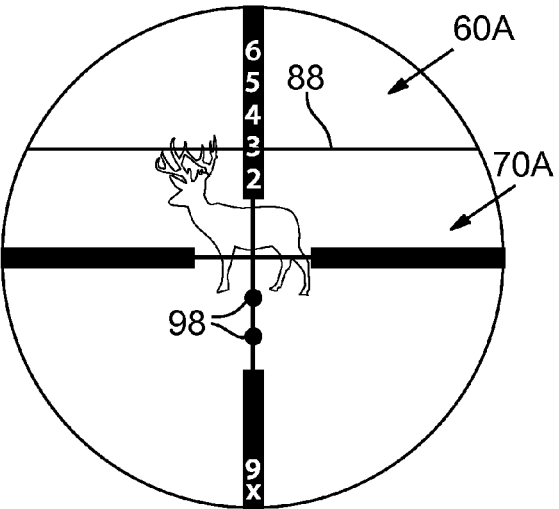
FIG. 5A    FIG. 5B
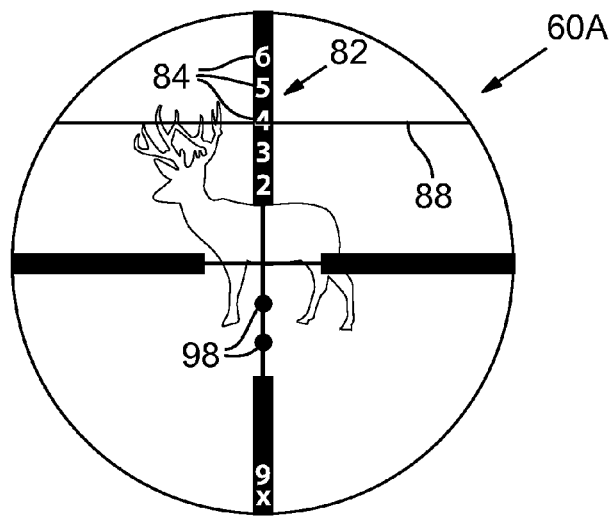
FIG. 5C

OPTICAL RANGEFINDER AND RETICLE SYSTEM FOR VARIABLE OPTICAL POWER SIGHTING DEVICES

TECHNICAL FIELD

The field of this disclosure relates to a two-part reticle system for variable optical power riflescopes and other zoom optical sighting devices useful for one or more purposes, such as estimation of the range to or size of a target, holdover adjustment indication, or for other purposes.

BACKGROUND

U.S. Pat. No. 3,386,330 of Burris et al. describes an optical rangefinding device previously sold by the former Redfield Company under the trademark ACCU-RANGE®, which includes a two-part reticle system in a variable optical power riflescope. A rear reticle located at a rear focal plane of the scope rearward of an adjustable erector system includes a pair of accurately spaced-apart fixed horizontal stadia wires having a spacing that does not change in the field of view as the erector lens system is adjusted to vary the optical power (image magnification) of the scope. A numeric scale etched in a glass post is inverted in a front focal plane of the scope forward of the power-varying erector lens system. In operation, the image magnification is adjusted until a feature of known size on the target, such as the shoulder to brisket dimension on a deer, just fills the space between the stadia wires. Because the numeric scale is located in the front focal plane, it appears to grow in size and move radially outward in the field of view as the image magnification is increased. The range to the target can be read as the place on the numeric scale at the edge of the field of view where the diaphragm stop of the scope intersects the scale. Due to the image magnification of the erector system, the numeric scale must be very finely etched in glass, which adds to the cost of the riflescope. The present inventors have recognized that great care must be taken during manufacturing to avoid any dirt or debris on the glass post, which would be readily visible under the magnification of the scope.

U.S. Pat. No. 3,684,376 of Lessard, U.S. Pat. No. 4,248,496 of Akin Jr. et al., and U.S. Pat. No. 4,389,791 of Ackerman describe variants of the Burris reticle system. In place of the front focal plane scale used by Burris, the Lessard and Akin Jr. et al. devices include rotating range readouts in the rear focal plane which are coupled to the power adjusting ring of the scope. While they may avoid some of the shortcomings of the Burris reticle system, the devices of Lessard, Akin Jr. et al., and Ackerman introduce different complexities in the rotating readout mechanisms.

The present inventors have identified a need for an improved two-component reticle system for optical rangefinding and holdover estimation.

SUMMARY

A reticle system for a variable optical power sighting device, such as a riflescope, includes a rear reticle located proximate a rear focal plane of the sighting device and a front reticle located proximate the front focal plane. The rear reticle is viewable through an eyepiece of the sighting device in a field of view thereof superimposed upon an erect image of a distant target and an inverted image of the front reticle, both formed at the rear focal plane. The rear reticle includes first and second bracketing marks spaced apart from each other a pre-selected distance and preferably includes a scale including graduated measurement indicia radiating away from the optical axis. In one embodiment, the measurement indicia form a rangefinding scale in which the measurement indicia increase in magnitude toward an outer boundary of the field of view. In another embodiment, the measurement indicia form a trophy scale in which the measurement indicia decrease in magnitude toward the outer boundary of the field of view. Because the scale of either variety is located in the rear focal plane, it does not change in size or location in the field of view as the optical power of the sight is increased or decreased.

The front reticle preferably includes an indicator portion radially offset from the optical axis so as to appear in the field of view in alignment with the scale of the rear reticle. Because it is offset from the optical axis, the indicator portion appears to shift in the field of view and move along the scale in response to adjustment of the image magnification. The position of the indicator relative to the scale indicates a measurement corresponding to a size of a feature of the distant target subtended in the field of view by the first and second bracketing marks. In the case of the rangefinding scale, the image magnification is adjusted until a feature of the distant target having a known or estimated size is bracketed or subtended in the field of view by the bracketing marks. The rangefinding scale then displays the range to the target. In the case of the trophy scale, the image magnification is adjusted until the bracketing marks approximately subtend a feature on the target of unknown size. The trophy scale indicates the spacing of the brackets at a known predetermined range. If the target is at the predetermined range, then the size of the bracketed feature can be read directly from the trophy scale based on the position of the indicator portion relative thereto. Alternatively, if the target is at a known range different from the predetermined range, the distance perpendicular to the line of sight at the target range subtended by the bracketing marks (and therefore the size of the bracketed feature) can be determined by the trophy scale readout multiplied by a factor representing a simple geometric relationship.

Locating the scale and measurement indicia in the rear focal plane allows the rear reticle to be electroformed with the measurement indicia outlined in a post portion of the rear reticle and allows the front reticle to comprise a simple wire spanning across the field of view, which results in a much less expensive reticle system than one in which an etched glass reticle or rotary display is used. The resulting reticle system is also durable and less prone to showing dirt and debris than systems in which a glass reticle is used. It may also provide a less cluttered appearance than many prior art reticles with improved light transmission.

Another reticle system disclosed includes an electronic reticle display such as an OELD display and a rear reticle including bracketing marks. The electronic reticle display may be located in either the front focal plane or the rear focal plane, and is responsive to adjustment of the optical power adjustment mechanism to display a holdover aiming point by way of an illuminated holdover mark or otherwise. In one embodiment, an electronic pickup such as an encoder or other sensor device is associated with the power adjusting mechanism of the scope and provides a signal input representing the optical magnification setting to an electronics module that drives the electronic reticle display. The bracketing marks of the rear reticle are used to compensate for the range to the target in the same manner as with other embodiments, described above, but a range display is optional because an appropriate one of the holdover aiming points is electronically displayed in response to the bracketing and power adjustment operation, facilitating accurate holdover aiming at the target range.

Additional aspects and advantages will be apparent from the following detailed description of preferred embodiments, which proceeds with reference to the accompanying drawings.

BRIEF DESCRIPTION OF THE DRAWINGS

FIG. 1 is a side section view of a riflescope including an optical rangefinding reticle system according to a first embodiment;

FIG. 2 is an enlarged view of a front reticle of the riflescope of FIG. 1;

FIG. 3 is an enlarged view of a rear reticle of the riflescope of FIG. 1;

FIGS. 5A, 5B, and 5C are pictorial views of a reticle system according to another embodiment shown at different degrees of magnification, illustrating how the back to brisket dimension on a deer is bracketed to determine a range to the deer;

DETAILED DESCRIPTION OF PREFERRED EMBODIMENTS

Figure 4:
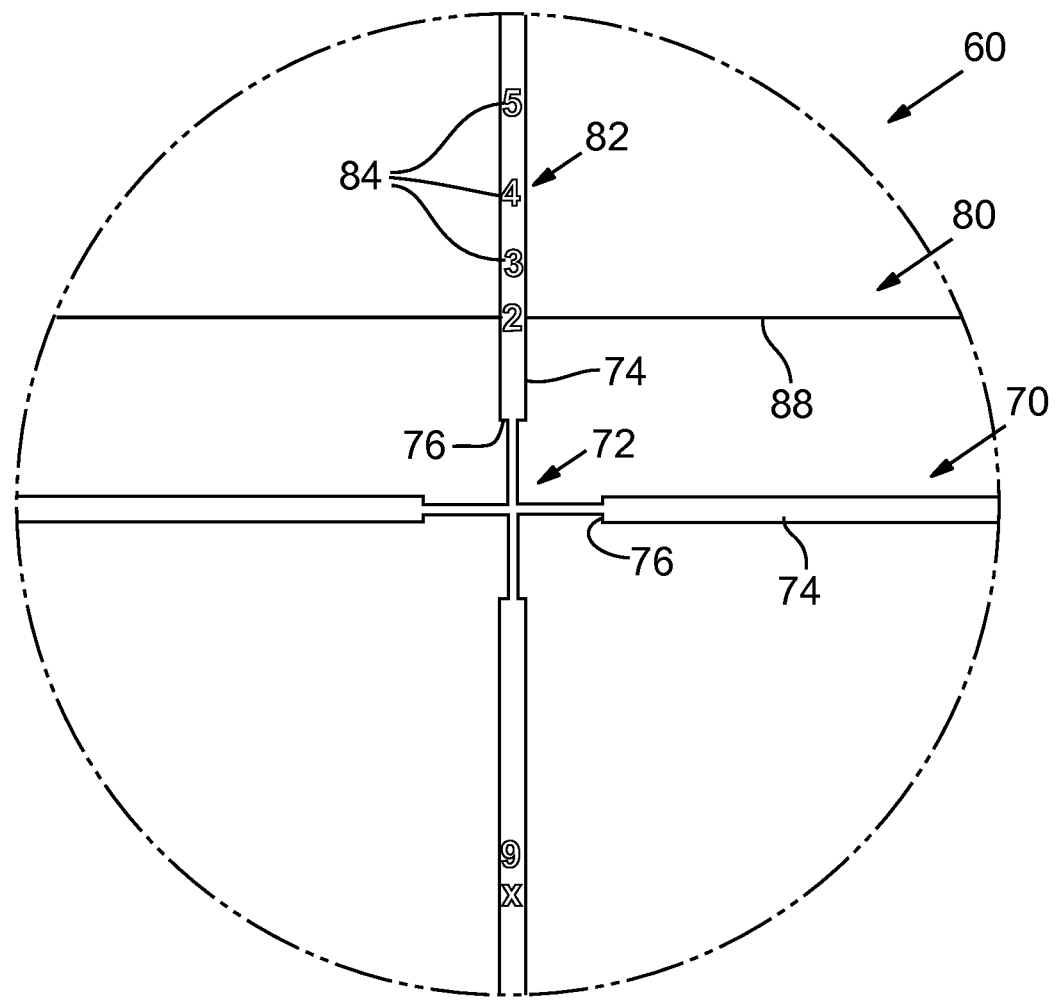
FIG. 4 is an enlarged view showing a field of view of the riflescope of FIG. 1 as viewed through the eyepiece thereof, showing the rear reticle of FIG. 3 superimposed on an inverted image of the front reticle of FIG. 2.

FIG. 1 shows a side cross-section view of a riflescope 10 in accordance with an embodiment of a direct view optical aiming device. Some embodiments of aiming devices and sighting devices, such as riflescope 10, may be mountable to a projectile weapon (not shown) in alignment with a weapon bore and sighted-in at a preselected range for purposes of aiming the projectile weapon. Other embodiments, such as spotting scopes, may be used independently of a weapon. Although embodiments illustrated in the drawings are shown as riflescopes and reticles therefor, the present disclosure is not intended to be limited to riflescopes. Many of the features described herein may be implemented in other aiming devices.

With reference to FIG. 1, riflescope 10 includes an elongate tubular housing 12 supporting an objective lens system 14 at a front end 16 of housing 12. Objective lens system 14 produces an image of a distant target (not shown) at a front focal plane (FFP) located behind objective lens system 14. In the embodiment illustrated, the image at the front focal plane FFP is inverted, but in other optical sight designs such as the high zoom optical system shown in U.S. Pat. No. 7,944,611 of Regan et al. with two erector lens systems and three focal planes, the image at a front focal plane may be erect.

An adjustable erector lens system 20 is located behind front focal plane FFP and configured to produce an erect image of the target at a rear focal plane (RFP) located rearward of front focal plane FFP and erector lens system 20. An eyepiece lens system 40 is located at a rear end 42 of housing 12 behind rear focal plane RFP and configured to focus upon the erect image. Erector lens system 20 may include several lens elements 22, 24, one or more of which is slideably mounted in a pivoting lens tube 30 within housing 12 as is conventional in the art. Movable lens elements 22, 24 of erector lens system 20 are driven by an optical power adjustment mechanism 32 including a rotating cam sleeve of lens tube 30 that is coupled to a manually adjustable power selector ring 34 encircling housing 12. Rotating the power selector ring 34 of optical power adjustment mechanism 32 drives lens elements 22, 24 of erector lens system 20 along the optical axis thereof (coincident with longitudinal axis 48 in FIG. 1) to achieve an adjustment of a degree of image magnification of riflescope 10 as perceived by the user viewing the erect image through eyepiece 40.

As illustrated in FIG. 1, erector lens system 20 is aligned with a longitudinal axis 48 of the riflescope 10 such that an optical axis of the erector lens system 20 is coincident therewith. However, an elevation setting of riflescope 10 can be adjusted by a rotating adjustment knob 50 that drives pivoting lens tube 30 for rotation in a generally vertical plane, thereby slightly rotating the optical axis of erector lens system 20 relative to longitudinal axis 48, as is conventional in the art.

In accordance with a first embodiment, a reticle system 60 of riflescope 10 includes a rear reticle 70 located proximate rear focal plane RFP and a front reticle 80 located proximate front focal plane FFP. The front reticle 80 and rear reticle 70 of reticle system 60 are viewable through eye piece lens system 40 superimposed on a field of view of a target scene, as illustrated in FIG. 4 and FIGS. 5A, 5B, and 5C, described in further detail below. Front and rear reticles 80, 70 cooperate with each other to accomplish an optical rangefinding function or one or more other functions, or both, as described below.

With reference to FIG. 3, rear reticle 70 is of a DUPLEX® design including a fine central crosshair 72 and widened post portions 74 radiating therefrom. The intersection of crosshairs 72 forms a central aiming mark identifying a primary aiming point corresponding to a point of impact at a sighted-in range of riflescope 10. The intersection of crosshairs 72 may also serve as one of two bracketing marks used for range estimation, as detailed below. An inner end 76 of any of post portions 74 may serve as a second of the two bracketing marks in the embodiment shown. In other embodiments, first and second bracketing marks may comprise any two spaced-apart marks of rear reticle 70 viewable in the field of view of eye piece 40 and having a predetermined fixed spacing, preferably sized for bracketing a feature of a game animal. In some embodiments, more than two bracketing marks having different predetermined spacing may be provided for bracketing different sizes of animals or other distant objects of a known size, for rangefinding purposes, as described below with reference to FIG. 8.

Turning again to FIG. 3, rear reticle 70 further includes a rangefinding scale 82 located in an upper post portion 74 of rear reticle 70, which includes graduated ranging measurement indicia 84 spaced apart along a radial direction radiating from the optical axis (e.g. radiating from the center of crosshairs 72) and increasing in magnitude toward an outer boundary 86 of the field of view. In the embodiment shown, ranging measurement indicia 84 are numbered from 2 to 5, namely 2, 3, 4, and 5 indicating ranges of 200 yards, 300 yards, 400 yards, and 500 yards. In other embodiments (not shown) different numerical indicia may be used to indicate other ranges measurable by reticle system 60, depending on the optical magnification of riflescope 10 or other aimed optical device in which reticle system 60 is implemented.

With reference with FIG. 2, front reticle 80 includes an indicator wire 88 spanning across a mounting ring 90 and attached by its ends 92, 94 to mounting ring 90. Indicator wire 88 is radially offset from the optical axis, as illustrated in FIGS. 1 and 2. The radial offset of indicator wire 88 causes the image of the indicator wire produced at front focal plane FFP to appear in the field of view in alignment with and adjacent the rangefinding scale 82 of rear reticle. The offset relative to optical axis also causes the image of indicator wire 88 to appear to shift in the field of view and move along rangefinding scale 82 in response to adjustment of the degree of image magnification by optical power adjustment mechanism 32. In operation, the image magnification is adjusted until a feature of the target of a known size, such as a shoulder to brisket dimension of a deer, is subtended (bracketed) in the field of view by the bracketing marks 72, 76. When the target feature of known size is so bracketed, the indicator wire 88 intersects rangefinding scale 82 to indicate the range to the target. FIG. 4 illustrates the reticle system 60 including front and rear reticles 80, 70 superimposed on a field of view of riflescope 10. Because the indicator wire 88 spans the entire field of view, it reduces or eliminates the perception of trackout—an optical phenomena occurring during adjustment of the image magnification which is caused by imperfections in the power adjustment mechanism 32 such as in guide tracks (not shown) of lens tube 30 which guide the axial movement of lens elements 22, 24.

FIGS. 5A, 5B, and 5C illustrate a variant of reticle system 60 identified as reticle system 60A having a slightly different design for rear reticle 70A. FIGS. 5A, 5B, and 5C provide a storyboard of the process of adjusting the optical power of riflescope 10 to perform a rangefinding operation to a target deer. FIG. 5A shows the reticle system 60A with the scope at a low image magnification setting for target acquisition purposes; FIG. 5B shows the reticle system 60A with the scope at an intermediate image magnification setting; and FIG. 5C shows reticle system 60A with the scope at a high image magnification setting, at which point the shoulder to brisket dimension of the deer is subtended by the first and second bracketing marks, consisting of center of crosshairs 72 and inner end 76 of top post portion 74, respectively. As illustrated in FIGS. 5A, 5B, and 5C, as the optical magnification of riflescope 10 is increased the indicator wire 88 appears to move vertically relative to rangefinding scale 82 until the shoulder to brisket of the deer is closely bracketed or subtended between the first and second bracketing marks (72, 76) as in FIG. 5C, at which point the intersection of indicator wire 88 with rangefinding scale 82 indicates a range to the deer of 400 yards.

Once the range to the target is determined, the shooter may compensate for ballistic drop either by adjusting the elevation setting of riflescope 10 via adjustment knob 50 or by holding over the target. In reticle system 60A shown in FIGS. 5A, 5B, and 5C, the rear reticle includes holdover aiming marks 98 that are spaced apart below the primary aiming point of crosshairs 72 to indicate holdover aiming locations for predetermined ranges or for holding over by predetermined amounts. Because the holdover aiming marks 98 are in the rear reticle, the amount of holdover will be affected by the optical power setting of the scope, so some further adjustment of the optical power setting may be necessary before taking a shot.

The embodiments of reticle system 60, 60A illustrated in FIGS. 2-4, 5A, 5B, and 5C include a rear reticle that is electroformed with the ranging measurement indicia 84 outlined in post portion 74. Forming the rear reticle 70 by an electroforming process results in a rangefinding display that is much less expensive and potentially more durable than an etched glass reticle located in the front focal plane FFP, as in U.S. Pat. No. 3,396,330 of Burris. An electroformed reticle is also less susceptible to showing dirt and debris than a glass reticle. However, in other embodiments (not shown), rear reticle 70, front reticle 80, or both, may be formed in a glass substrate by etching or otherwise. When rear reticle 70 is etched or otherwise formed on a glass substrate disc, the first and second bracketing marks need not be part of a structure connected to a peripheral mounting ring (not shown) at an outer edge of reticle 70, and may be instead comprised of two or more "floating" marks (not shown) formed on the surface of the glass reticle.

Although indicator wire 88 is one preferred embodiment of a front reticle indicator portion that reduces or eliminates perceptible trackout, in other embodiments the indicator portion of the front reticle 80 may include a post or any other mark (not shown) that is either aligned with or adjacent a scale located in the front focal plane FFP, such as rangefinding scale 82, so as to move relative thereto upon changes in the optical image magnification. For example, the rangefinding scale 82 may be outlined in the body of a post portion 74 of rear reticle 70, as illustrated in FIG. 3, and the indicator portion of the front reticle may comprise a post (not shown) that overlaps or is overlapped by the post portion 74 of rear reticle 70. The extent to which the post of rear reticle 70 covers the numerical indicia of the rangefinding scale 82 allows the user to read the rangefinding scale 82. An indicator post of this type will appear to grow in width by the same ratio as increases in the optical power, while the post appears to move toward the outer boundary 86 of the field of view. However, if sized correctly it is possible for such an indicator post to remain hidden behind the post portion 74 throughout the range of magnification while still serving to provide an indicator that allows a user to read out the scale.

Figure 6:
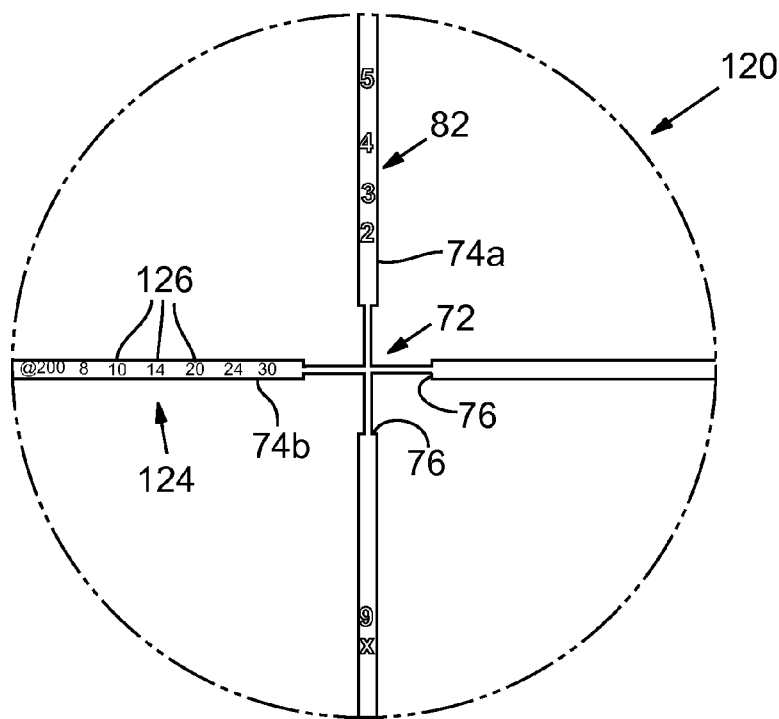
FIG. 6 is an enlarged view of a rear reticle according to another embodiment, including a target scale and a rangefinding scale.
Figure 7:
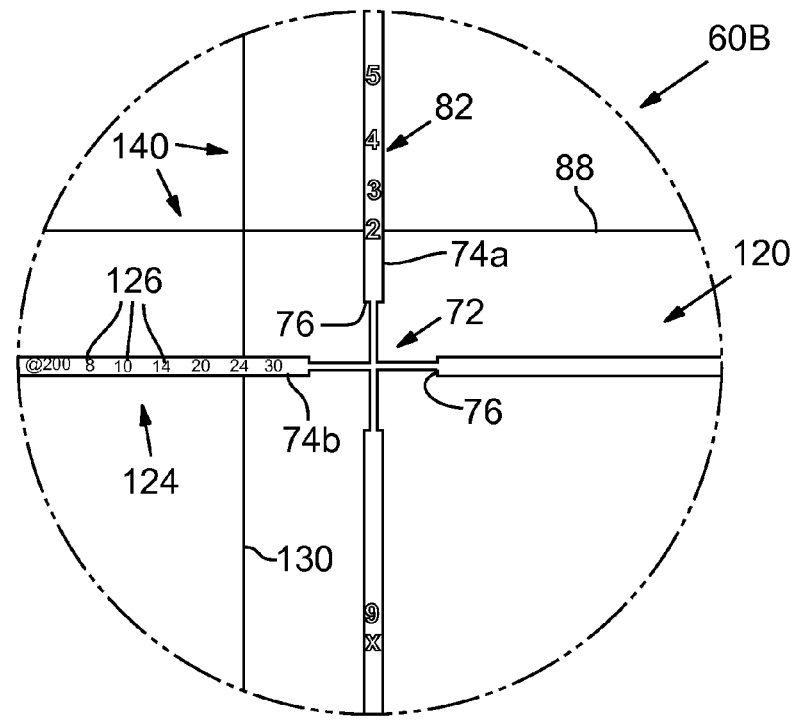
FIG. 7 is an enlarged view of the rear reticle of FIG. 6 superimposed in the field of view on two wires providing readout indicia for the scales.

FIG. 6 illustrates a rear reticle 120 according to another embodiment including a rangefinding scale 82 formed in an upper vertical post portion 74a of rear reticle 120 and a separate trophy measurement scale 124 formed in a horizontal post portion 74b of rear reticle 120. In another embodiment (not shown) the positions of the trophy measurement scale 124 and rangefinding scale 82 may be switched and/or the rangefinding scale 82 may be omitted. Trophy measurement scale 124 includes graduated trophy size measurement indicia 126 spaced apart along horizontal post portion 74b in a radial direction and decreasing in magnitude toward an outer boundary 86 of the field of view. FIG. 7 is a display of a reticle system 60B in the field of view of a riflescope utilizing rear reticle 120 of FIG. 6 and showing first and second indicator wires 88 and 130 superimposed in the field of view over rear reticle 120. Indicator wires 88 and 130 are included in a front reticle 140 located at front focal point (FFP). Vertical indicator wire 130 cooperates with trophy size measurement indicia 126 in response to adjustment of the degree of image magnification of the scope to indicate a linear dimension, perpendicular to a line of sight of the scope at a predetermined range, that is subtended in the field of view by the center of crosshairs 72 and inner end 76 of one of the posts (e.g., posts 74a or 74b). In practice, the user must know the range or approximate range to the target to utilize the trophy measurement scale 124. To use the trophy measurement scale, the user adjusts the image magnification of the scope until a feature of a target such as the antlers of a game animal are closely bracketed between the bracketing marks (e.g., crosshairs 72, and inner end 76 of post 74b). The degree of image magnification then establishes the distance between the bracketing marks at a predetermined calibration range. For example, the trophy measurement scale 124 shown in FIGS. 6 and 7 is calibrated for 200 yards and each of the size measurement indicia 126 displays a size in inches. If the feature to be measured is located at a different range than the calibration range, the readout of the trophy measurement scale can be multiplied by a scaling factor in accordance with the geometric relationship of the sight and the target scene. For example, if the target is known to be at 400 yards rather than 200 yards, a trophy measurement scale readout of 20 would be multiplied by a factor of 2 to indicate a trophy size of 40 inches. If the target is known or estimated to be at 500 yards rather than 200 yards, a trophy measurement scale readout of 20 would be multiplied by a factor of 5/2 to result in a trophy size of 50 inches.

Figure 8:
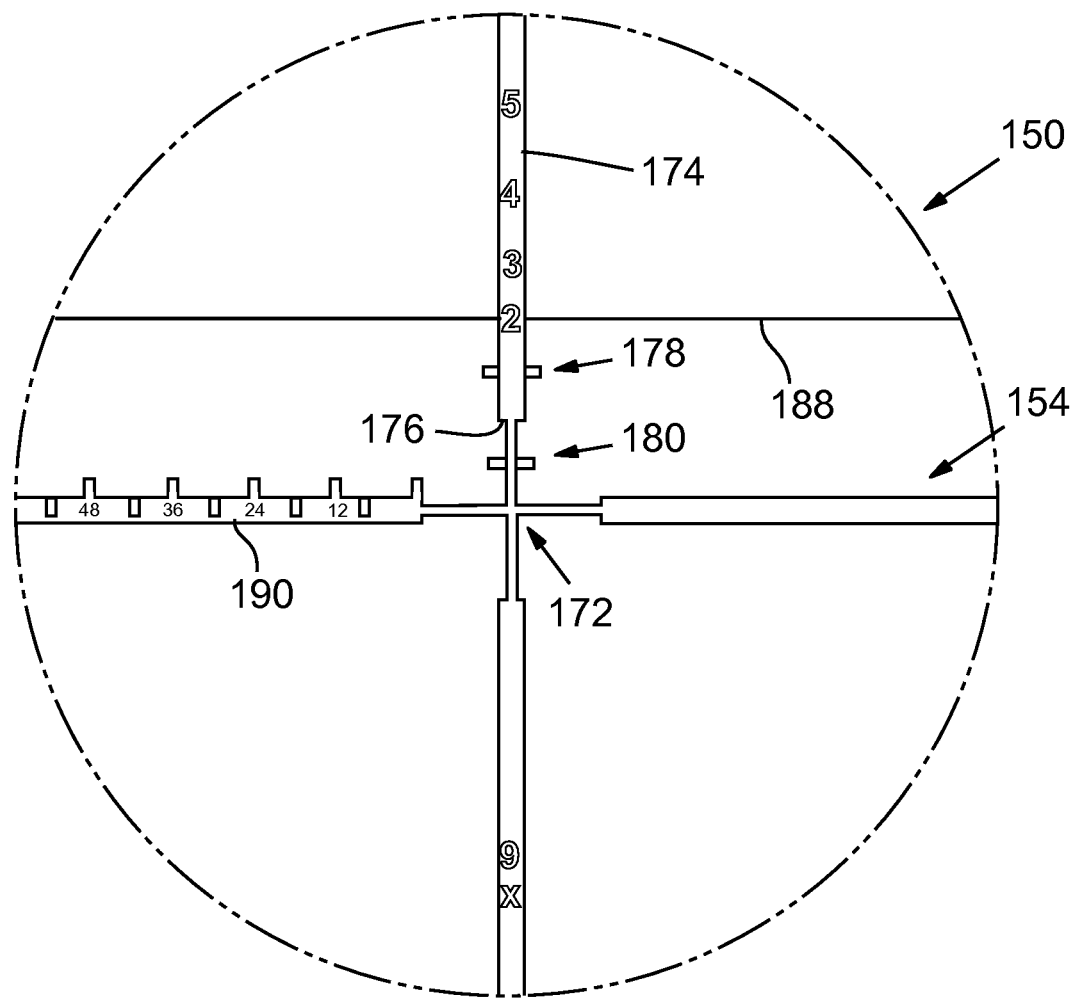
FIG. 8 illustrates a reticle system according to another embodiment, including multiple bracketing marks along a vertical portion of a rear reticle of the system for rangefinding and a trophy size scale along the horizontal post of the rear reticle of the reticle system.

FIG. 8 illustrates a reticle system 150 including several pairs of bracketing marks for rangefinding purposes. With reference to FIG. 8, a rear reticle 154 of reticle system 150 includes cross hairs 172, the intersection of which forms a first bracketing mark. A second bracketing mark 180 is formed on rear reticle 154 at a location spaced from first bracketing mark 172 so as to subtend an 8-inch dimension perpendicular to the line of sight at a range of 200 yards, wherein 8 inches is the typical size of a varmint such as a prairie dog. An end 176 of a post portion 174 of rear reticle 154 comprises a third bracketing mark spaced apart from first bracketing mark 172 a distance such that the first and third bracketing marks subtend a 16-inch target a range of 200 yards, which is the typical shoulder to brisket dimension for a white-tailed deer. And a fourth bracketing mark 178 is included along post portion 174 a distance from first bracketing mark 172 such that first and fourth bracketing marks subtend a feature 25 inches in size at 200 yards, which is the typical shoulder to brisket measurement on an elk. A trophy scale 186 is included along a horizontal post portion 190 of a rear reticle 154. In use, an optical magnification of the scope is adjusted until a game animal or other feature of known size is bracketed between a pair of the bracketing marks 172, 178, 180, etc. Adjustment of optical magnification causes an indicator wire 188 located in a front focal plane of the scope to appear to move radially relative to rear reticle 154 for indicating a range to the target, as previously described with reference to FIGS. 4, 5A, 5B, and 5C. Adjustment of the optical magnification for purposes of rangefinding utilizing indicator wire 188 also calibrates trophy scale 186 for the range to the bracketed item. Thereafter, trophy scale 186 may be used to measure a dimension of an item at the same range as the bracketed game animal (or other bracketed item), such as antlers of the game animal.

Figure 9:
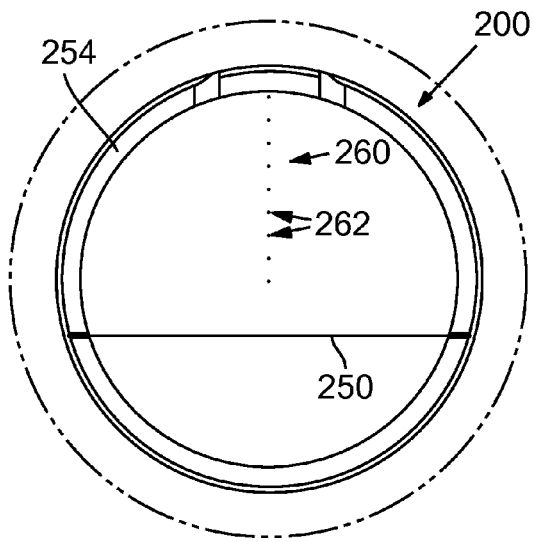
FIG. 9 is a view of a front reticle according to another embodiment including an electronic reticle display section with multiple holdover aiming marks.
Figure 10:
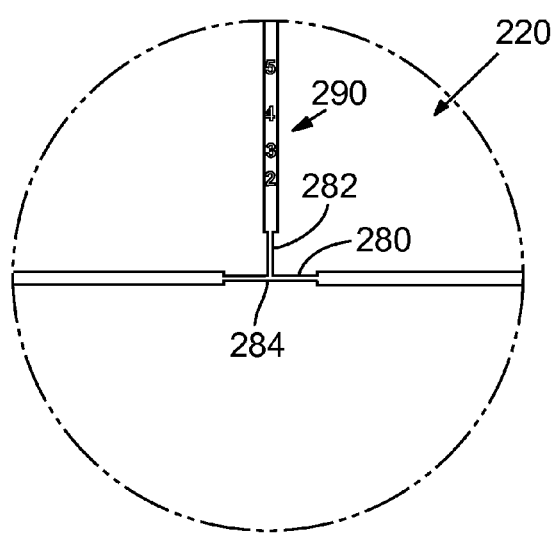
FIG. 10 is a view of a rear reticle for use with the front reticle of FIG. 9.
Figure 11A:
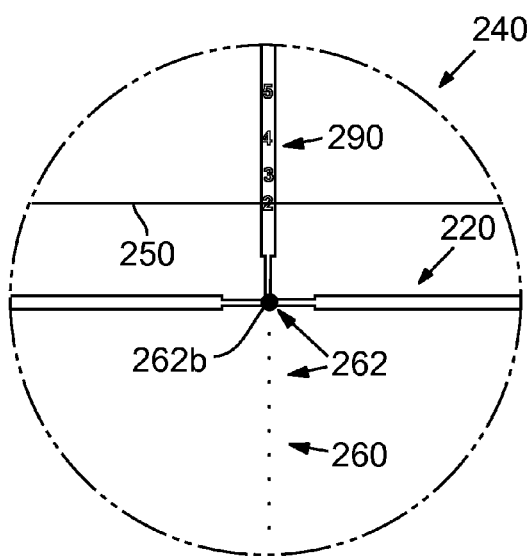
FIG. 11A illustrates a reticle system including the rear reticle of FIG. 10 superimposed on the inverted image of the front reticle of FIG. 9, shown at low magnification and with a central holdover aiming mark of the electronic reticle displayed.
Figure 11B:
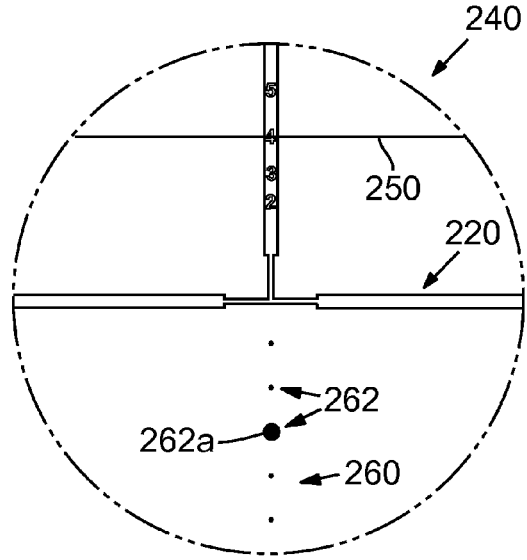
FIG. 11B shows the reticle system of FIG. 11A at an increased optical magnification and with a holdover aiming mark of the electronic reticle displayed below the central primary aiming point.

FIGS. 9 and 10 show respective front and rear reticles 200 and 220 in accordance with a reticle system 240 of another embodiment, further illustrated in FIGS. 11A and 11B showing reticles 200 and 220 superimposed in the field of view of a scope. With particular reference to FIG. 9, front reticle 200 includes a horizontal indicator mark 250 comprising a wire that spans across a mounting ring 254 below an optical axis of the sight and an electronic reticle display 260 preferably formed in a glass reticle mounted adjacent the wire of indicator mark 250. In the field of view shown in FIG. 11A, a set of spaced apart holdover aiming marks 262 of electronic reticle display 260 depend downwardly from a primary aiming point 284 (FIG. 10) formed by the intersection of a horizontal crosshair portion 280 and vertical crosshair portion 282 of rear reticle 220. In another embodiment, indicator mark 250 and electronic reticle display 260 are both formed on a glass reticle disk, with indicator mark 250 preferably etched and permanently marked on the glass and electronic reticle display 260 including selectively addressable illumination aim points 262 spaced apart along a vertical axis and extending upwardly from the optical axis. Front reticle 200 may include an OLED display or other suitable selectively transparent display or transparent light emitting display formed on a glass substrate with some or all of the features of front reticle 200, and preferably for selectively displaying at least the selectively addressable aiming points 262. In some embodiments, front reticle 200 may include an OLED display on one side of a glass reticle disc and permanently etched or marked portions on the other side of the glass reticle disc. In other embodiments, front reticle may be formed using another type of display, such as a holographic display or a projected reticle display, for example. The particular type of electronic display is not critical, although a transmissive or transparent electronic display is advantageous.

In operation, a range to the target is determined by optically bracketing a feature of known size of the target as discussed above with reference to FIGS. 5A, 5B, and 5C, whereby indicator mark 250 cooperates with a rangefinding scale 290 in rear reticle 220 to indicate a range to the target. At the same time, the degree of adjustment of the optical power is used to control the electronic reticle display. More particularly, the electronic reticle display is responsive to the adjustment of the optical power adjustment mechanism to display, emphasize, or illuminate one of the holdover aiming marks 262 to provide an aim point for an expected point of impact on the distant target for a ballistic projectile to be launched by a rifle of other weapon aligned with the sighting device. For example, as illustrated in FIG. 11B, if the optical rangefinder is used to determine that the range to the target is 400 yards, one of the holdover aiming marks 262 corresponding to holdover for a 400-yard distant target is illuminated, as indicated by the enlarged holdover mark 262a. If a different range is indicated, such as 200 yards as illustrated in FIG. 11A, a different one of the holdover aiming marks 262b would be illuminated or otherwise emphasized in the field of view via electronic reticle display 260. In one embodiment, the optical magnification setting is determined by the position of the optical power selector ring 34 of a riflescope via by an encoder or other electronic sensor indicia associated with riflescope or power indicator ring, which provides a digital or analog input to a microprocessor onboard the scope that drives the electronic reticle display 260 for selectively illuminating one or more of the aiming marks 262 or for other purposes. In another embodiment, not shown, the rangefinding scale 290 and indicator mark 250 may be omitted while retaining the electronic display and bracketing marks to provide the automatic holdover indication capability of the reticle system 240. In still other embodiments, electronic reticle display 260 may include other aiming features other than or in addition to holdover aiming marks 262.

In other embodiments, not shown, different types of electronic reticle displays may be utilized in the front or rear focal planes and responsive to adjustment of the image magnification by the optical power selector ring or otherwise to provide visual feedback to the user indicative of a range to a target or other measurable aspects of a target scene. In one embodiment, a button (not shown) is provided on power selector ring 34 or some other place on riflescope 10 and coupled to the reticle display control electronics (not illustrated). When the button is depressed and released, the range to the target is locked in along with any associated electronic display, thereby allowing further adjustment of the optical power of the riflescope 10 without affecting the range display, holdover display or other range-dependent feature responsive to a rangefinding operation. For example, once a range to a target is determined by adjusting power selector 34 so that the target is bracketed between bracketing marks, the button may be depressed and released to lock in the range; and thereafter the optical magnification may be further adjusted (e.g., to the maximum optical magnification) by further rotation of power selector ring 34 to provide improved target visibility without affecting the range-responsive display, so long as the button is not depressed a second time.

It will be obvious to those having skill in the art that many changes may be made to the details of the above-described embodiments without departing from the underlying principles of the invention. The scope of the present invention should, therefore, be determined only by the following claims.

The inventon claimed is:

1. A reticle system for a variable optical power sighting device, the sighting device including an objective lens system that produces an image of a distant target at a front focal plane located behind the objective lens system, an adjustable erector lens system located behind the front focal plane and configured to produce an erect image of the distant target at a rear focal plane rearward of the front focal plane, an eyepiece lens located behind the rear focal plane and configured to focus upon the erect image, and an optical power adjustment mechanism operable to adjust an axial position of at least a portion of the erector lens system along an optical axis of the erector assembly so as to adjust of a degree of image magnification of the sighting device, the reticle system comprising:
   a rear reticle located proximate the rear focal plane and viewable through the eyepiece in a field of view thereof superimposed upon the erect image, the rear reticle including first and second bracketing marks spaced apart from each other a pre-selected distance, and a scale including graduated measurement indicia spaced apart along a radial direction radiating from the optical axis and either increasing or decreasing in magnitude toward an outer boundary of the field of view; and
   a front reticle located proximate the front focal plane including an indicator portion radially offset from the optical axis so as to appear in the field of view in alignment with the scale of the rear reticle, the indicator portion thereby appearing to shift in the field of view and move along the scale in response to adjustment of the degree of image magnification to indicate a measurement corresponding to a size of a feature of the distant target subtended in the field of view by the first and second bracketing marks.

2. The reticle system of claim 1, in which the rear reticle is electroformed.

3. The reticle system of claim 2, in which the graduated measurement indicia are outlined in a post portion of the rear reticle radiating away from the optical axis.

4. The reticle system of claim 1, in which the rear reticle is etched on glass.

5. The reticle system of claim 1, in which the indicator portion of the front reticle comprises a wire spanning across a mounting ring and attached by its ends to the mounting ring.

6. The reticle system of claim 1, in which the front reticle is etched on glass.

7. The reticle system of claim 1, in which the first and second bracketing marks comprise a central crosshair and an inner end of a post portion of the rear reticle, respectively.

8. The reticle system of claim 1, in which the scale comprises a rangefinding scale wherein the indicator portion of the front reticle cooperates with the measurement indicia to display a range to the distant target in response to adjustment of the degree of image magnification until a feature of the distant target having a known or estimated reference size is subtended in the field of view by the first and second bracketing marks.

9. The reticle system of claim 1, in which the scale comprises an adjustable trophy measurement scale wherein the indicator portion of the front reticle cooperates with the measurement indicia in response to adjustment of the degree of image magnification to indicate a linear dimension, perpendicular to a line of sight of the sighting device at a predetermined measurement range, that is subtended in the field of view by the first and second bracketing marks at a selected degree of image magnification.

10. The reticle system of claim 1, in which the scale of the rear reticle includes both a rangefinding scale and a trophy measurement scale.

11. The reticle system of claim 1, further comprising an electronic reticle display responsive to adjustment of the optical power adjustment mechanism to display a holdover aiming point below the optical center.

12. The reticle system of claim 11, in which the electronic reticle display includes an illuminated reticle display located proximate the front focal plane.

13. A reticle system for a variable optical power sighting device, the sighting device mountable on a projectile weapon in alignment therewith and including an objective lens system that produces an image of a distant target at a front focal plane located behind the objective lens system, an adjustable erector lens system located behind the front focal plane and configured to produce an erect image of the distant target at a rear focal plane rearward of the front focal plane, an eyepiece lens located behind the rear focal plane and configured to focus upon the erect image, and an optical power adjustment mechanism operable to adjust an axial position of at least a portion of the erector lens system along an optical axis of the erector assembly so as to adjust of a degree of image magnification of the sighting device, the reticle system comprising:
   a rear reticle located proximate the rear focal plane and viewable through the eyepiece in a field of view thereof superimposed upon the erect image, the rear reticle including first and second bracketing marks spaced apart from each other a pre-selected distance; and
   an electronic reticle display responsive to adjustment of the optical power adjustment mechanism to display in the field of view one of several holdover aiming marks spaced apart along a vertical axis below a primary aiming point so that, when the optical power adjustment mechanism is adjusted to the degree of image magnification at which a feature of the distant target having a known or estimated reference size is subtended in the field of view by the first and second bracketing marks, the displayed one of the holdover aiming marks is superimposed on the erect image of the distant target at a point of impact on the distant target for a ballistic projectile when launched by a projectile weapon aligned with the sighting device.

14. The reticle system of claim 13, in which the electronic reticle display is located proximate the front focal plane.

15. The reticle system of claim 13, in which the electronic reticle display is included in the rear reticle proximate the rear focal plane.

16. The reticle system of claim 13, in which the primary aiming point coincides with the path of the ballistic projectile at a sighted-in range different from the range to the distant target.

17. The reticle system of claim 13, in which:
the rear reticle further includes a scale including graduated measurement indicia spaced apart along a radial direction radiating from the optical axis and either increasing or decreasing in magnitude toward an outer boundary of the field of view; and
the front reticle further including an indicator portion radially offset from the optical axis so as to appear in the field of view in alignment with the scale of the rear reticle, the indicator portion thereby appearing to shift in the field of view and move along the scale in response to adjustment of the degree of image magnification to indicate a measurement corresponding to a size of a feature of the distant target subtended in the field of view by the first and second bracketing marks.

18. The reticle system of claim 17, in which the rear reticle is electroformed.

19. The reticle system of claim 18, in which the graduated measurement indicia are outlined in a post portion of the rear reticle.

20. The reticle system of claim 13, in which the rear reticle is electroformed.

* * * * *

UNITED STATES PATENT AND TRADEMARK OFFICE
CERTIFICATE OF CORRECTION

PATENT NO.        : 8,705,173 B2
APPLICATION NO.   : 13/343680
DATED             : April 22, 2014
INVENTOR(S)       : Victoria J. Peters et al.

It is certified that error appears in the above-identified patent and that said Letters Patent is hereby corrected as shown below:

On the title page, item 57, in the abstract, line 7, replace "optical axis it appears" with --optical axis such that it appears--.

In the Specification

In column 5, line 20, replace "rear reticle" with --rear reticle 70--.

In column 8, line 23, replace "front reticle" with --front reticle 200--.

In column 8, line 40, replace "of other weapon" with --or other weapon--.

In column 8, line 53, insert --the-- before "riflescope".

In the Claims

In column 9, line 40, replace "adjust of a degree" with --adjust a degree--.

In column 10, line 50, replace "adjust of a degree" with --adjust a degree--.

Signed and Sealed this
Second Day of June, 2015

Michelle K. Lee
*Director of the United States Patent and Trademark Office*